United States Patent [19]

Sebb et al.

[11] Patent Number: 4,572,825

[45] Date of Patent: Feb. 25, 1986

[54] PROCESS FOR BLEACHING NATURAL CHALK

[75] Inventors: Werner Sebb, Geretsried; Heinrich Dammann, Söhlde, both of Fed. Rep. of Germany

[73] Assignee: Peroxide-Chemie GmbH, Höllriegelskreuth, Fed. Rep. of Germany

[21] Appl. No.: 381,990

[22] Filed: May 25, 1982

[30] Foreign Application Priority Data

Jun. 4, 1981 [DE] Fed. Rep. of Germany ....... 3122218

[51] Int. Cl.$^4$ ............................................. G01F 11/18
[52] U.S. Cl. .................................... 423/173; 423/264
[58] Field of Search ........................ 423/173, 264, 430

[56] References Cited

U.S. PATENT DOCUMENTS 4,239,736 12/1980 Fenske ................................ 423/173

FOREIGN PATENT DOCUMENTS 1069276 5/1967 United Kingdom ................ 423/173
1285891 8/1972 United Kingdom ................ 423/430

Primary Examiner—John Doll
Assistant Examiner—Wayne A. Langel
Attorney, Agent, or Firm—Felfe & Lynch

[57] ABSTRACT

For bleaching natural chalk, an aqueous suspension consisting of 50 to 80% by weight fine-grained natural chalk and 50 to 20% by weight water and containing 0.1 to 1.5% by weight, based on the dry weight of the chalk, of a dispersant and optionally containing a hydrogen peroxide stabilizer or activator or a salt of hydrogen peroxide with a divalent metal is prepared, the suspension is wet ground to reduce the particle size until about 9/10 of the particles have a grain size of <4, the suspension is mixed with hydrogen peroxide or a salt of hydrogen peroxide with a divalent metal at temperatures between 50° and 99° C. and at a specific pH-value or at an alkaline pH, respectively, and stirred intensively until it is mixed and foaming commences, the suspension is allowed to stand until foam formation is complete and then the foam formed is separated with the dark particles contained therein.

7 Claims, No Drawings

PROCESS FOR BLEACHING NATURAL CHALK

The invention relates to a process for bleaching natural chalk by treating fine chalk particles in an aqueous medium with hydrogen peroxide at elevated temperature.

Chalk is widely used as writing chalk, as a filler for rubber and plastics, for paper coating compounds, for the production of paints, in cable production, for glazier's putty and toothpowder. The natural chalk deposits located in many parts of the earth are the raw materials for chalk. These natural chalk deposits are often characterised by an astonighingly high degree of purity, but it has been found that the degree of purity or whiteness is still not quite sufficient for many purposes and can be increased by appropriate purification operations.

Conventional purification methods for chalk are e.g. simple slurry processes.

Particularly stringent requirements in terms of purity and whiteness have to be met especially by chalks in coating compounds for the paper industry. In the case of chalks for paper coating compounds there is the dual problem of purifying the chalk as far as possible to begin with and then reducing the grain size of the purified chalk even further so as to increase the whiteness somewhat more.

A process for purifying white mineral carbonates, including chalk, is known from GBP 1 069 276. This purification process involves treating the carbonate with hydrogen peroxide, chlorine or bromine. For example, a mixture of 1 part by weight chalk and 2 parts by weight water is mixed at a pH of 10 with an $H_2O_2$ solution; after stirring for a relatively long time at ambient temperature, filtration and drying, a bleached chalk is obtained. This process is suitable mainly for separating the dark coloured humic acids contained in chalks. The product obtained is not, however, a pigment coating compound.

A process is also known from GBP 1 264 190, according to which clays, bleaching earths and kaolin can be decolorized and bleached by treatment with aqueous oxidising agents. Accordingly, an aqueous suspension of these earths is bleached, optionally at elevated temperature, in a pH range between 3.5 and 5.5, with a metal dithionite or at a pH of about 3.5 with NaOCl or at a pH of 5.5 with $H_2O_2$. The bleaching treatment of kaolin with hydrogen peroxide is conducted e.g. in such a way that a mixture of 20% by weight kaolin and 80% by weight water is mixed with $H_2O_2$ and boiled. After acidification, filtration and drying, a bleached product is obtained. The product obtained is not chalk and moreover is not a pigment coating compound.

The invention is therefore based on the task of providing a process for purifying and bleaching natural chalk, whereby the chalk is obtained in a highly purified form and whereby the product is used directly, if possible, as a white pigment coating compound or can be processed further to a white paper coating compound.

A process for bleaching chalk has now been found according to which a suspension of chalk in water containing a dispersant is caused to foam by treatment with aqueous $H_2O_2$ at elevated temperature and the unwanted particles produced or contained in the chalk are transferred almost completely to the foam together with which they can be separated off.

The subject of the invention is thus the process according to claim 1.

The chalk to be treated according to the invention can differ somewhat in its composition depending on the place in which it is found. A frequently used natural chalk consists for example of 93% by weight $CaCO_3$, 4% by weight aluminium silicate, 0.5% by weight iron compounds, 0.3% by weight manganese salts, small quantities of copper and nickel compounds and small quantities of dark coloured humic acids.

The aqueous suspension to be bleached according to the invention contains natural chalk in the finely divided form, i.e. at least 9/10 of the particles should have a particle size of $<4\mu$ (corresponding to a surface area of 3–10 m$^2$/g). As unground natural chalk usually has a coarser particle structure however, the particle size must be reduced accordingly before bleaching according to the invention is actually carried out. This is effected by wet grinding the dispersion containing a dispersant in a wet grinding mill conventionally used for such purposes.

A suspension to be treated according to the invention has a relatively high solids content of 50–80% by weight, preferably 60–70% by weight. In order to ensure that such a high solids suspension remains sufficiently viscous to permit wet grinding and subsequent bleaching with $H_2O_2$ according to the invention, it is necessary to add suitable dispersants. Another advantage deriving from the addition of dispersants is the fact that a pigment coating compound is obtained as a process product which, in many cases, can immediately undergo further processing.

The following can be mentioned as dispersants suitable for the bleaching process according to the invention. These dispersants are generally used in a quantity of 0.1 to 1.5% by weight, based on the dry weight of the chalk; a quantity of 0.4 to 1.0% by weight is preferred.

Aqueous $H_2O_2$ is added to the suspension thus prepared at temperatures of between 50° and 90° C., with intensive stirring. The $H_2O_2$ is generally added all at once and with intensive stirring; stirring is continued until foam starts to form but then stopped so that the incipient foam formation can proceed undisturbed. 30 to 60% by weight $H_2O_2$ is added in preference. The quantity required depends on the quality of the chalk used and is about 0.5 to 5% by weight in total, based on the dry weight of the chalk. Instead of $H_2O_2$, a salt of this with a divalent metal can also be used, preferably calcium peroxide, magnesium peroxide or zinc peroxide. The following statements also apply to such a salt.

The reaction temperature should be at least 50° C. but generally not more than 90° C., so that the release of oxygen from the $H_2O_2$ and the subsequent oxidation reactions and foam formation take place sufficiently rapidly but in a controlled manner. A temperature range between 70° and 80° C. is preferred.

When the chalk particles contained in the suspension are being wet ground to the desired size, a considerable amount of heat is produced which leads to an increase in the temperature of the suspension. This quantity of heat can be used to heat the suspension to be treated according to the invention to the desired reaction temperature for the $H_2O_2$ treatment according to the invention. In order to use the thermal energy liberated, the process stage of $H_2O_2$ treatment is therefore preferably carried out immediately after the process stage of wet grinding during which the suspension becomes heated.

The process according to the invention takes place favourably at the natural pH of the chalk which is approximately between 8 and 9. It has been shown however, that even better results can be achieved if some alkali is added and the pH thus increased. The pH is preferably raised to a region between 9 and 10.

During the course of the reaction, the hydrogen peroxide decomposes into oxygen and water. The oxygen formed is consumed partly by oxidising organic impurities such as humic acids and partly by forming the foam out of the suspension, with which the unwanted particles and oxidation products in the suspension are carried out of the suspension.

The rate of decomposition of the hydrogen peroxide and the optimum rate of oxidation and foam formation can be regulated not only by changing the temperature, pH and addition of $H_2O_2$ but also by adding stabilisers or activators. For example, stabilisation can be effected by adding waterglass. Whether a stabiliser or an activator should be added in a specific case will depend, amongst other things, on the temperature at which the process is to be carried out. Stabilisation is often advantageous in the upper range of the applicable temperature interval, and activation in the lower range. Suitable stabilisers for this purpose include for example inorganic and organic phosphorous compounds, such as $Na_3PO_4$, $Na_4P_2O_7$ or phosphonic acid derivatives, sodium silicate (=waterglass), chelating agents such as EDTA, DTPA and NTA.

Foam formation is a prominent feature of the process according to the invention. The foam rising up out of the aqueous chalk suspension also carries the oxidation products formed in the suspension and other unwanted particles contained therein out of the suspension. This foam has a dark, grey-brown to black colour. This dirty foam which forms above the chalk suspension can be separated easily according to conventional methods, for example by mechanical removal or by suction. Measurement of the whiteness of a chalk sample after foam development was complete gave an average improvement in the brightness of 2 to 3 points.

A further increase in the whiteness by an average of about 0.5 to 1.5 points is achieved by allowing the remaining hydrogen peroxide to continue reacting with the organic impurities still present for about half an hour to two hours at elevated temperature. Accordingly, according to a preferred process variant, heating of the suspension in the presence of excess hydrogen peroxide is continued after foam development is complete; the suspension is preferably heated to 60° to 80° C. for half an hour to two hours. The process product thus obtained has a whiteness improved by an average of 4 points.

According to the process of the invention, a chalk suspension is thus obtained with a high solids content and an improved whiteness as compared with the starting product. The compounds obtained according to the invention can be used either directly as water-containing fillers or they can be processed further, optionally to a white paper coating compound of a particular quality or to a dry, white, finely divided filler, abrasive etc.

It is quite crucial for the outcome of the process according to the invention that the dispersants contained in the suspension are obviously not oxidised by hydrogen peroxide or the oxygen produced therefrom. This means the dispersants contained are not decomposed or otherwise destroyed or removed during the course of the process, but retain their original effectiveness as dispersants. The process product obtained consequently does not simply represent a mixture of chalk and water but it has the properties of a pigment coating compound consisting of a mixture of chalk and water and a dispersant contained therein.

The examples illustrate the invention.

EXAMPLE 1

A suspension of chalk and water, district of Steinburg. Analytical data: $CaO=52.4\%$, $CO_2=41.8\%$, $SiO_2=3.73\%$, $Al_2O_3=0.54\%$, $MgO=0.66\%$, Fe (II+III)=0.67%, $Mn=0.29\%$, $Ni=0.01\%$, $Cn=0.002\%$; and water and a dispersant in which the solids content was 64% by weight and the dispersant content was 0.6% by weight and in which 80% of the particles were smaller than 4$\mu$ and had an average surface area of 5 $m^2/g$, was mixed at 70° C. with 0.2% by weight waterglass (38° Be), 0.1% by weight solid sodium hydroxide and 1.5% by weight 50% hydrogen peroxide, all weight details based on the dry weight of the chalk used; the addition was conducted in 10 minute intervals with intensive stirring and in the order given. After the $H_2O_2$ had been added, stirring was continued for another 5 minutes. About 2 to 3 minutes after the end of the stirring process, increasing foaming began which increased the total volume by about half. The dark coloured foam was removed continuously over a period of 10 minutes; after that, the foaming became appreciably less. A sample of the suspension taken after 10 minutes still exhibited a marked $H_2O_2$ content.

After a sample taken had been dried, ground and made into a moulding, a whiteness increase of 2.5 points was determined.

After a further reaction time of 1 hour at 70° C., only traces of $H_2O_2$ were still present in the remaining suspension/pigment coating compound. A dried sample now had a whiteness that was 3.5 points higher than an untreated sample. The overall bleaching effect of 3.5 points is therefore composed of 2.5 points from the foaming process according to the invention and 1 point from the after-bleach with excess $H_2O_2$.

We claim:

1. A process for bleaching natural chalk by treatment with hydrogen peroxide in an aqueous medium, comprising the steps of
   (a) preparing an aqueous suspension of 50 to 80% by weight fine grained natural chalk and 50 to 20% by weight water and containing 0.1 to 1.5% by weight, based on the dry weight of the chalk, of a dispersant and optionally contining a hydrogen peroxide stabilizer or activator or a salt of hydrogen peroxide with a divalent metal,
   (b) wet grinding the suspension to reduce the particle size until about 9/10 of the particles have a grain size of <4$\mu$ (corresponding to a surface area of 3-10 $m^2/g$),
   (c) mixing the suspension with hydrogen peroxide or a salt of hydrogen peroxide with a divalent metal at temperatures between 50° and 99° C. and at an alkaline pH and stirring intensively until it is mixed and foaming commences,
   (d) allowing the suspension to stand until foam formation is complete, and then
   (e) separating the foam formed with the dark particles contained therein.

2. Process according to claim 1, characterised in that a dispersant is added to the suspension in a quantity of 0.4-1.0% by weight, based on the dry weight of the chalk.

3. Process according to claim 1 or 2, characterized in that a temperature of 70° to 80° C. is maintained in stage (c).

4. Process according to claim 1 or 2, characterized in that a pH of between 8 and 10 is adjusted in stage (c).

5. Process according to claim 1 or 2, characterized in that 30 to 60% by weight hydrogen peroxide is added.

6. Process according to claim 1, characterised in that the grinding according to process stage (b) is carried out immediately before process stage (c) and the thermal energy liberated during grinding is used for heating according to process stage (c).

7. Process according to claim 1 characterised in that the foam free suspension which still contains hydrogen peroxide is heated to 60° to 80° C. for half an hour to two hours.

* * * * *